United States Patent [19]

Le Naour-Sene

[11] 4,286,957
[45] Sep. 1, 1981

[54] PROCESS OF INTEGRATING A PHOTOCHROMIC SUBSTANCE INTO AN OPHTHALMIC LENS AND A PHOTOCHROMIC LENS OF ORGANIC MATERIAL

[75] Inventor: Lyliane Le Naour-Séné, Vincennes, France

[73] Assignee: Essilor International "Cie Generale d'Optique", Creteil, France

[21] Appl. No.: 2,303

[22] Filed: Jan. 10, 1979

[51] Int. Cl.³ .......................... D06P 5/00; G03B 21/46
[52] U.S. Cl. ........................................... 8/471; 8/506; 8/509; 8/515; 351/163
[58] Field of Search ................ 8/2.5 A, 471, 509, 515, 8/471, 509, 515, 506

[56] References Cited

U.S. PATENT DOCUMENTS

| 2,715,363 | 8/1955 | Hoover | 8/2.5 A |
| 4,043,637 | 8/1977 | Hovey | 350/160 P |
| 4,059,471 | 11/1977 | Haigh | 8/2.5 A |
| 4,097,230 | 6/1978 | Sandhu | 8/2.5 A |
| 4,153,412 | 5/1979 | Bailey | 8/2.5 A |

FOREIGN PATENT DOCUMENTS 2347018  6/1974  Fed. Rep. of Germany .
1418089  12/1975  United Kingdom .

Primary Examiner—A. Lionel Clingman
Attorney, Agent, or Firm—Charles E. Brown

[57] ABSTRACT

A process of integrating a photochromic substance, especially a spiropyran or a metal dithizonate, into a transparent substrate of polymerized organic material such as poly [ethylene glycol di-allyl di-carbonate] by thermal transfer, comprising applying the photochromic substance alone or with a solvent and/or thickening agent to the surface of a transparent organic substrate such as a lens disc, and heating until the photochromic substance is sublimed and then diffused and anchored in the organic material of the lens, preferably just beneath the surface to which it is applied. Preferably, the photochromic substance is initially carried on a temporarily support for application.

17 Claims, 3 Drawing Figures

PROCESS OF INTEGRATING A PHOTOCHROMIC SUBSTANCE INTO AN OPHTHALMIC LENS AND A PHOTOCHROMIC LENS OF ORGANIC MATERIAL

BACKGROUND OF THE INVENTION

The present invention relates generally to photochromic products and articles, i.e., products or articles comprising a photochromic substance capable of reversibly changing color or opacity when exposed to predetermined radiation, and more particularly, to a photochromic substrate such as an ophthalmic lens of organic material, and a process of integrating a photochromic substance into such a substrate or lens.

Photochromic ophthalmic lenses which have been commercialized up to the present, for sunglasses, are generally of mineral glass, and the photochromic substance which they comprise is also of a mineral nature. Most frequently, the substance is a silver halide.

Tests have been performed with a view to using such a photochromic substance in lenses of organic material; the conclusion reached was that there is in practice incompatibility between the two, as the silver halide in the midst of the organic material does not have a suitable reaction to external radiation.

As for organic lens sold under the trade designation CR39 and consisting of poly [ethylene glycol di-allyl di-carbonate] this incompatibility is due to the nature of the catalyst required for the polymerization of the basic monomer. The only catalyst now in use which gives satisfaction for such a polymerization is isopropyl percarbonate, which by reason of oxidation destroys the photochromic properties of the silver halide.

To overcome this difficulty it has been attempted to coat the silver halide particles with an inorganic protective coating, of silica for example, which is impermeable to organic products; this is a costly solution which is moreover inefficacious.

It was then attempted to substitute the silver halide with a photochromic substance of organic nature. Various proposals have been made in this regard whereby such a substance is dispersed throughout the body of the organic material constituting the lens. No such proposal has proved really satisfactory.

One of the reasons that such proposals have not been satisfactory lies, as above, in the incompatibility of the photochromic substances with the polymerization catalyst, and in the practical difficulties encountered in performing such procedures, namely the coating, which was envisaged to obviate this problem.

Other proposals have consisted in consolidating the photochromic substance in the midst of a particular layer intermediate two outer layers of organic material; performance of such a method is tedious.

Yet further proposals treat otherwise finished lenses, and therefore after polymerization of their constituent organic material, so as to avoid contact between the photochromic substance utilized and the catalyst for the polymerization.

According to a first of these last proposals, the photochromic substance is deposited in a film on the ophthalmic lens to be treated, such a film is inevitably subjected to impacts, scratching and abrasion thereby spoiling its continuity and therefore the homogeneity of the sought after photochromism.

In a second of these last proposals, the ophthalmic lens to be treated is immersed in a concentrated solution of the photochromic substance in a solvent, in practice toluene, at ebullition, 70° C.; the photochromic substance may be spiropyran as disclosed in French printed patent application No. 2,211,666 or a metal dithizonate as disclosed in French printed patent application No. 2,236,479.

However, in order to sufficiently impregnate the ophthalmic lenses treated, the immersion must be prolonged, for at least 24 hours, and on account of the boiling of the solution used, special procedures were required to satisfactorily recover the solvent vapors, thereby making such a process rather difficult to perform. Moreover, the results obtained were disappointing.

Furthermore, organic photochromic substances known to date are subject to ageing; after a rather short time, in any event less than the normal life of sunglasses, they become inert and no longer react to the radiation to which they are exposed.

Considering it is a substance dispersed deep in the ophthalmic lens concerned, such ageing inevitably means that the sunglasses have become worthless.

If such a substance is deposited in a film on the ophthalmic lenses it would obviously be conceivable to regenerate the same once it has aged, but in practice, for reasons already developed, such a regeneration with processes known to date, has proven to be inexpedient and too expensive to be worth while. Accordingly such lenses too would become worthless after ageing.

SUMMARY OF THE INVENTION

An object of the present invention is the provision of a process adapted to expediently integrate a photochromic substance into any kind of organic based material, for example an ophthalmic lens of organic material, namely CR 39. The performance of such a process is moreover sufficiently expedient so that in case of photochromic substances ageing, it would be possible to quickly and cheaply recharge or regenerate their substrates or lenses when desired.

Another object is a substrate of transparent base, and in particular ophthalmic lenses of organic material, such as CR 39, treated in accordance with the process.

The present invention is founded on the surprising observation that the photochromic substance of organic nature, or at least some of them, are advantageously capable of undergoing "thermal transfer", that is, the transfer of the photochromic from the external surface of the lens or other substrate into the organic material constituting the lens or other substrate upon the application of heat. The process of thermal transfer is known per se. The vapor tension of such photochromic substances is sufficiently high to satisfy the requirements of such a process and their compatibility with the material of the lens or other substrate concerned, namely, organic material, is sufficient for them to be absorbed in vapor form into the organic material; thereafter the photochromic substance returns to a solid state and is anchored in the organic material. The unexpected aspect of this observation resides in the fact that one would normally expect that the application of heat to such photochromic substances, necessary for such thermal transfer, would be detrimental or even destructive to their photochromic properties.

This was not found to be the case, at least under the conditions of application disclosed herein, where heat is applied to the photochromic substance for a very short time.

According to one aspect of the invention in which a photochromic substance is integrated into an ophthalmic lens of organic material, there is provided a process characterized by thermally transferring the photochromic substance onto the otherwise finished substrate, i.e., bringing a photochromic material at least in part comprising such a photochromic substance into contact with the substrate, and applying heat to the photochromic material thus in contact with the substrate.

Such a process may be easily carried out without any highly complex and/or expensive equipment, by any practitioner i.e., optician, and requires only a short operation, which takes about a minute.

Such a photochromic ophthalmic lens may therefore, at little cost, be recharged or regenerated upon request, after ageing of the photochromic substance, should this occur.

Furthermore, although the photochromic substance is essentially concentrated proximate to the surface of the lens, this is merely a preferred feature, it nevertheless remains anchored in the organic material of the lens and therefore distinguishable over a surface film which merely lies on the outer surface of the lens; and the photochromic substance is therefore protected by the mechanical properties of the organic material constituting the lens against impacts, scratching and abrasion.

As in the case of immersion impregnation the thermal transfer process operates on the otherwise finished product, that is to say the polymerized product, which avoids all reactions between the photochromic substance and the polymerization catalyst, as the latter is no longer active once polymerization has been completed.

However, in addition to the chemical process of diffusion in a gaseous phase which is novel, its expediency and speed as well as its real effectiveness enable its actual application to organic material lenses to be envisaged.

The features and advantages of the invention will be rought out in the description which follows, by way of example, with reference to the accompanying schematic drawings.

DETAILED DESCRIPTION OF THE PREFERRED EMBODIMENTS

The drawings illustrate the invention as applied to ophthalmic lenses.

Figure 1:
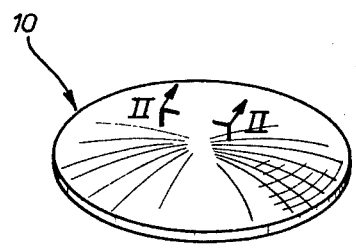
FIG. 1 represents a perspective view of photochromic ophthalmic lens made of organic material embodying the invention.

In FIG. 1 is visible an ophthalmic lens designated by general reference numeral 10.

For the purposes of the present application the expression ophthalmic lens means the circular lens disc furnished to opticians to be mounted in eyeglass frames after appropriate edging and contouring of the lens disc by the optician.

The ophthalmic lenses of organic material are for example made of poly [ethylene glycol di-allyl di-carbonate] usually sold under the trade designation CR 39. Such an organic ophthalmic lens may, alternatively, be made of polycarbonate or methyl polymethacrylate or even transparent polyurethane.

The object of the invention is to integrate a photochromic substance into the basic substrate of translucent organic material of which the ophthalmic lens is comprised.

To this end the present invention provides for the thermal transfer, that is, putting photochromic material made up at least in part of a photochromic substance into contact with such an ophthalmic lens and applying heat to the photochromic material thus in contact with the ophthalmic lens.

Of course the photochromic substance must be compatible with the organic material(s). In addition vapor pressure itself must admit off thermal transfer.

Photochromic substances which belong to the spiropyran group fulfill this dual requirement satisfactorily.

It is known that spiropyrans have the following general formula:

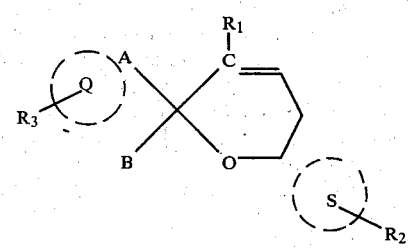

in which the various symbols represent the following:
A=O, S, or C carrying two substituted alkyl radicals;
B=S or N substituted by an alkyl, hydroxyalkyl or alkoxyalkyl radical;
$R_1$=H, a halogen, an alkyl radical, aromatic, alkoxy, nitrile, or phenoxy radical;
S=aromatic radical having one or more $R_2$ substituents;
$R_2$=halogen, nitro or alkoxy radical;
Q=aromatic cyclic system or a heterocycle carrying alkyl radical or halogen $R_3$ substituents.

Other photochromic substances which are also satisfactory belong to the group of metal dithizonate.

As it is known, they are internal complexes given between different metals and dithizone which has the following general formula:

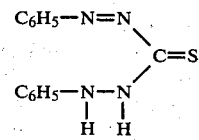

In practice such substances are preferably used in liquid or pasty form.

Therefore one proceeds to disperse the photochromic substance in a suitable solvent, optionally with the addition of a binder acting as a thickening agent, so that the desired viscosity may be attained.

In the case of using the photochromic substance in liquid form such a binder may be nitrocellulose; alternatively in the case of a photochromic substance in pasty form the binder may be collodion or pasticized nitrocellulose. In either case, when the photochromic substance is a spiropyran, the solvent may be an amyl acetate, butyl acetate, a mixture of the two, or even an aromatic solvent.

The photochromic substance may be applied directly to the ophthalmic lens 10, if desired, with a paint brush, for example.

Still, preferably, the photochromic substance is applied by the intermediary of an auxiliary temporary support to which the photochromic material is initially adhered.

Figure 3:
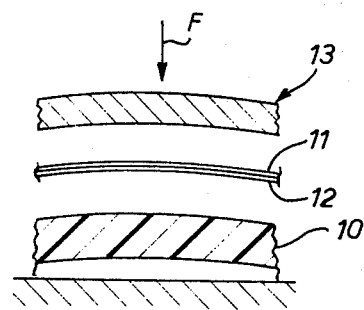
FIG. 3 is a diagrammatic view showing the steps of a preferred process of integrating the photochromic substance into an ophthalmic lens of organic material.
Figure 1:
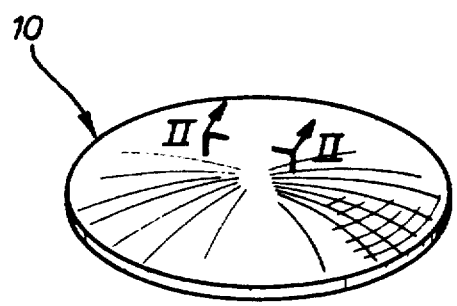
Figure 2:
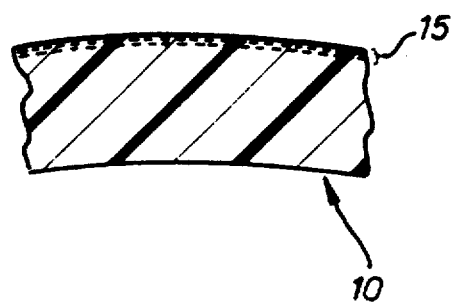
Figure 3:
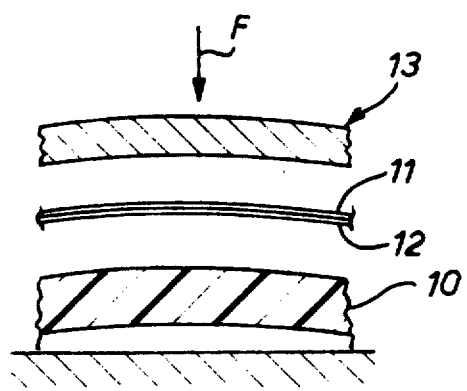

Such a process is schematically illustrated in FIG. 3 where an ophthalmic lens 10 to be treated is illustrated.

As a temporary support a sheet 11 of kraft paper or filter paper may be employed. Such a sheet is covered generally with a coating 12 of a photochromic material, as defined above, then dried by evaporating the solvent or solvents initially part of the photochromic material.

In addition to this, the solvent permits more expedient dispersion of the photochromic substance which is part of the photochromic material; it affords, by evaporation, a quicker drying of the sheet 11 on which the material is temporarily adhered.

Whether the photochromic material is applied directly to the ophthalmic lens 10 or applied first to a temporary support and then transferred to the lens 10, the process according to the invention requires heating the material when it is in contact with the lens.

In the example illustrated in FIG. 3, heat is applied by means of a heating implement 13 having the general configuration of the lens 10 to be treated, to bring it into position as indicated by arrow F in FIG. 3, against the sheet 11 carrying the coating of photochromic material 12. The heating implement 13 is held in place for a short time, of the order of 45 seconds, the pressure applied being just enough so that the contact between the photochromic material 12 and the lens 10 occurs under satisfactory conditions.

The temperature of the heating implement 12 is selected so that the temperature of the temporary support sheet 11 is held low, for example between 180° and 220° C.

If desired, before bringing the lens 10 into contact with the coating of photochromic material 12 the lens may be preheated to a temperature less than that at which thermal transfer subsequently occurs, of the order of, say, 100° C. Nevertheless, the lens may also stay at ambient temperature until treatment.

Likewise, if desired, it is possible to avoid any contact between the heating implement 13 and the sheet of the temporary support 11 by interposing between the implement and the sheet another sheet or layer (not shown).

In any event, during the application of heat to the photochromic material 12 by means of the heating implement 20, at least part of the photochromic substance forming this material is sublimed and as this sublimation is effected by the contact with the lens to be treated 10, at least part of the vapor produced is diffused and absorbed by the organic material of which the lens is comprised.

After integration of the photochromic substance thus effected, the lens 10 is washed with a solvent adapted to remove surplus photochromic substance which was not sublimed or absorbed and perhaps the binder originally associated therewith.

Figure 2:
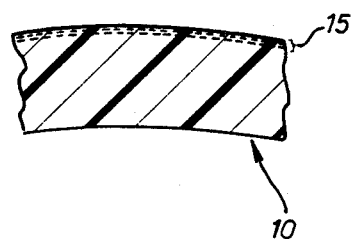
FIG. 2 is a fragmentary sectional view, on an enlarged scale, of the lens in FIG. 1, taken along line II—II.

The part of the photochromic substance which, after sublimation, has migrated into the constituent organic material of the lens 10 and absorbed thereby, then forms in the organic material of the lens at the surface thereof, proximate to which it is amassed, as represented in FIG. 2, a zone 15 which is an integral part of the lens, owing to migration, which therefore possesses the desired photochromic properties due to this substance.

To better illustrate the invention examples of photochromic mixtures capable of use in the invention which have given satisfactory results are set forth together with their conditions of application.

In addition, for each mixture an optical test was carried out as follows:

The lens was subjected to ultraviolet light for one minute by means of radiation provided by a 400 watt mercury vapor lamp which reproduces the solar spectrum of light, due to an inferential filter, and the optical density of the lens was measured before irradiation ($D_o$) then after irradiation (D). The differential $\Delta D = D - D_o$ characterizes the effectiveness of the corresponding photochromic mixture.

All percentages are given by weight throughout.

EXAMPLE 1

Composition

| | |
|---|---|
| photochromic substance: | |
| trimetoxy 2,4,6 phenyl dithizonate mercury | 2% |
| solvent: | |
| ethyl alcohol | 59% |
| ethyl acetate | 19% |
| thickening agent: | |
| plastizied nitrocellulose with dibutyl phtalate | 20% |

Conditions of application

A filter paper was impregnated with the mixture and dried until complete dessiccation.

The filter paper was then placed on the lens to be treated and heated to 210° C. by means of a metal plate forming a lens heating implement for 45 seconds.

After thermal transfer the lens was washed with acetone.

| Results | | |
|---|---|---|
| $D_o = 0.1146$ | $D = 0.2628$ | $\Delta D = 0.1482$ |

EXAMPLE 2

Composition

The composition was identical to that of example 1 except that the photochromic substance was trifluoromethyl 2 phenyl mercury dithizonate.

Conditions of application

Same as Example 1.

| Results | | |
|---|---|---|
| $D_o = 0.0836$ | $D = 0.1864$ | $\Delta D = 0.1028$ |

EXAMPLE 3

Composition

Composition identical to that of Example 1 except that the photochromic substance was cyclohexil mercury dithizonate.

Conditions of application

Same as Example 1.

| Results | | |
|---|---|---|
| $D_o = 0.1379$ | $D = 0.2328$ | $\Delta D = 0.0949$ |

EXAMPLE 4

Composition

Identical to that of Example 1 except that the photochromic substance was phenyl mercury dithizonate.

Conditions of application

Same as Example 1.

| Results | | |
|---|---|---|
| $D_o = 0.1403$ | $D = 0.2219$ | $\Delta D = 0.0816$ |

EXAMPLE 5

Composition

| Photochromic substance [trimethyl 1,3,3-indolino] 2-spiro 2' nitro 6' metoxy 8' benzopyran | 1% |
|---|---|
| solvent and thickening agent: | |
| benzene | 10% |
| glycerophtalic varnish | 89% |

Conditions of application

Same as Example 1.

| Results | | |
|---|---|---|
| $D_o = 0.1278$ | $D = 0.4330$ | $\Delta D = 0.3052$ |

EXAMPLE 6

Composition photochromic substance:

| [dimethyl 3,3 isopropyl 1 indolino] 2 spiro 2' nitro 6 methoxy 8' bensopyran | 1% |
|---|---|
| solvent and thickening agent: | |
| benzene | 10% |
| glycerophtalic varnish | 89% |

Conditions of application

Same as Example 1.

| Results | | |
|---|---|---|
| $D_o = 0.9545$ | $D = 0.2104$ | $\Delta D = 0.156$ |

EXAMPLE 7

Composition photochromic substance:

| [dimethyl 3,3 isopropyl 1 indolino] 2 spiro 2' nitro 6 methyl thioisopropyl 8' benzopyran | 1% |
|---|---|

| solvent and thickening agent: | |
|---|---|
| benzene | 10% |
| glycerophtalic varnish | 89% |

Conditions of application

Same as Example 1.

| Results | | |
|---|---|---|
| $D_o = 0.0696$ | $D = 0.1349$ | $\Delta D = 0.0753$ |

EXAMPLE 8

Composition photochromic substance:

| [methyl 3 benzothiazole] 2 spiro 2' nitro 6' methoxy 8' benzopyran | 5% |
|---|---|
| solvent: | |
| benzene | 95% |

Conditions of application

The lens was coated with the mixture and the solvent was allowed to evaporate. A sheet of aluminum was applied to the surface of the lens to be treated which serves as an intermediary between the lens and a heating plate. The heating lasted 30 seconds at about 210° C.

| Results | | |
|---|---|---|
| $D_o = 0.0362$ | $D = 0.0835$ | $\Delta D = 0.0473$ |

EXAMPLE 9

Composition photochromic substance:

| [methyl 3 benzothiazole] 2 spiro 2' propoxy 3' nitro 6' methoxy 8' benzopyran | 5% |
|---|---|
| solvent: | |
| benzene | 95% |

Conditions of application

Same as Example 8.

| Results | | |
|---|---|---|
| $D_o = 0.0362$ | $D = 0.0706$ | $\Delta D = 0.0464$ |

EXAMPLE 10

Composition photochromic substance:

| [methyl 3 benzoxazole 1,3] 2 spiro 2' phenoxy 3' nitro 6' methoxy 8' benzopyran | 5% |
|---|---|
| solvent: | |
| benzene | 95% |

Conditions of application

The mixture was impregnated into a filter paper. The paper was dried, then put into contact with a lens to be treated, and heated for 45 seconds at 200° C.

Results $D_o = 0.0605$  $D = 0.1238$  $\Delta D = 0.0633$

EXAMPLE 11

Composition photochromic sugstance:

| | |
|---|---|
| [trimethyl 3,4,4, oxazole] 2 spiro 2' propoxy 3' nitro 6' methoxy 8' benzopyran | 5% |
| solvent: | |
| benzene | 95% |

Conditions of application

Same as Example 10.

Results $D_o = 0.0530$  $D = 0.0942$  $\Delta D = 0.0412$

EXAMPLE 12

Composition photochromic substance

| | |
|---|---|
| [hexamethyl 3,4,5,5,6,6-oxazine 1,3]-2-spiro 2' methyl 3' nitro 6' methoxy 8' benzopyran | 5% |
| solvent: | |
| benzene | 95% |

Conditions of application

Same as Example 10.

Results $D_o = 0.0540$  $D = 0.0757$  $\Delta D = 0.0217$

The present invention is, of course, not intended to be limited to the modes and compositions described herein but on the contrary encompasses all modifications, alternatives and expedients. For example it is possible to carry out thermal transfer under vacuum conditions which permits the temperature required for transfer to be diminished.

In addition, as will be understood, the depth of penetration of the photochromic substance into the ophthalmic lens is not critical. For a desired tint all that counts is the overall density of the substance in the lens taken transversely, i.e. generally parallel to the optical axis thereof.

What I claim is:

1. A process of integrating a photochromic substance into a transparent substrate of polymerized organic material comprising the steps of placing a photochromic material containing a photochromic substance into contact with the substrate, and heating the photochromic material thus in contact with the substrate thereby thermally transferring the photochromic substance into the substrate.

2. A process according to claim 1, the photochromic material initially being carried by a temporary support sheet, comprising applying the temporary support sheet against the substrate to place the photochromic material in contact with the substrate.

3. A process according to claim 1 or 2, wherein the heating step comprises bringing a heating implement of generally the same configuration as the substrate into heat conductive relation with the substrate.

4. A process according to claim 1, comprising before placing the photochromic material into contact with the substrate, preheating the substrate to a temperature less than the temperature at which the photochromic substance is transferred into the substrate.

5. A process according to claim 1, wherein the photochromic substance is a spiropyran.

6. A process according to claim 1, wherein the photochromic substance is a metal dithizonate.

7. A process according to claim 1 or 2, further comprising washing the substrate with a solvent after thermal transfer of the photochromic substance.

8. A process according to claim 1, wherein the organic material is selected from the group consisting of poly [ethylene glycol di-allyl di-carbonate], polycarbonate, methyl polymethacrylate, and transparent polyurethane.

9. A process of integrating a photochromic substance into a transparent substrate of polymerized organic material comprising the steps of applying a photochromic substance on the transparent substrate and heating the photochromic substance thus in contact with the substrate until the photochromic substance sublimes, and allowing the sublimed photochromic substance to be absorbed into organic material of the substrate.

10. A process of making a photochromic ophthalmic lens comprising applying a photochromic material containing at least in part a photochromic substance to a transparent organic ophthalmic lens or lens disc, applying heat to the photochromic material thus in contact with the lens or lens disc until the photochromic substance is thermally transferred from the surface of the ophthalmic lens or lens disc into the organic material constituting the lens or lens disc by sublimation and absorption of the photochromic substance.

11. A process of impregnating a photochromic substance selected from the group consisting of metal dithizonates and spiropyrans into a substrate of transparent polymerized organic material selected from the group consisting of poly[ethylene glycol di-allyl di-carbonate], polycarbonate, methyl polymethacrylate and transparent polyurethane, comprising the steps of applying a photochromic material containing a photochromic substance to the transparent substrate, then heating the photochromic substance thus in contact with the transparent substrate whereby the photochromic substance is absorbed into the organic material of the substrate.

12. A process according to claim 1, 9 or 10, further comprising allowing the photochromic substance to penetrate into the organic material of the substrate to a depth immediately beneath the surface to which it was applied.

13. A photochromic ophthalmic lens formed by the process of claim 10.

14. A photochromic ophthalmic lens according to claim 13, wherein the photochromic substance is located immediately beneath the surface of the lens.

15. A process of regenerating aged photochromic substrates according to claim 1 or 9, wherein said steps are repeated on an aged photochromic substrate.

16. A process of regenerating aged photochromic lenses according to claim 10, wherein said steps are repeated on an aged photochromic lens.

17. A process according to claim 1, 9 or 10, wherein said heating step comprises heating to about 210° C. for about 30 to 45 seconds.

* * * * *

REEXAMINATION CERTIFICATE (1528th)
United States Patent [19]

Le Naour-Séné

[11] B1 4,286,957
[45] Certificate Issued Aug. 13, 1991

[54] PROCESS OF INTEGRATING A PHOTOCHROMIC SUBSTANCE INTO AN OPTHALMIC LENS AND A PHOTOCHROMIC LENS OF ORGANIC MATERIAL

[75] Inventor: Lyliane Le Naour-Séné, Vincennes, France

[73] Assignee: Essilor International "Cie General d'Optique", France

Reexamination Request:
No. 90/002,232, Dec. 13, 1990

Reexamination Certificate for:
Patent No.: 4,286,957
Issued: Sep. 1, 1981
Appl. No.: 2,303
Filed: Jan. 10, 1979

[51] Int. Cl.$^5$ ............ G02B 1/12; G02C 7/10; G03B 21/46; B05D 1/34
[52] U.S. Cl. ............ 8/471; 8/506; 351/163
[58] Field of Search ............ 8/471, 506

[56] References Cited
U.S. PATENT DOCUMENTS

| | | | |
|---|---|---|---|
| 3,239,366 | 3/1966 | Miller et al. | 117/36.1 |
| 3,346,385 | 10/1967 | Foris | 96/36 |
| 3,508,810 | 4/1970 | Baltzer | 350/160 |
| 3,519,635 | 7/1970 | Meriwether | 252/300 |
| 3,625,731 | 12/1971 | Taylor | 117/38 |
| 3,679,351 | 7/1972 | Weissbein et al. | 8/444 |
| 3,707,346 | 12/1972 | Markert et al. | 8/471 |
| 4,043,637 | 8/1977 | Hovey | 350/160 P |
| 4,395,263 | 7/1983 | Davis | 8/471 |

FOREIGN PATENT DOCUMENTS

| | | |
|---|---|---|
| 2632418 | 2/1977 | Fed. Rep. of Germany . |
| 47-36420 | 9/1972 | Japan . |
| 49-41689 | 4/1974 | Japan . |
| 50-10487 | 4/1975 | Japan . |

OTHER PUBLICATIONS

"Dyes For Heat Transfer Printing", by J. Aihara et al., American Dyestuff Reporter, Feb., 1975, pp. 46–52.

Primary Examiner—A. Lionel Clingman

[57] ABSTRACT

A process of integrating a photochromic substance, especially a spiropyran or a metal dithizonate, into a transparent substrate of polymerized organic material such as poly [ethylene glycol di-allyl di-carbonate] by thermal transfer, comprising applying the photochromic substance alone or with a solvent and/or thickening agent to the surface of a transparent organic substrate such as a lens disc, and heating until the photochromic substance is sublimed and then diffused and anchored in the organic material of the lens, preferably just beneath the surface to which it is applied. Preferably, the photochromic substance is initially carried on a temporarily support for application.

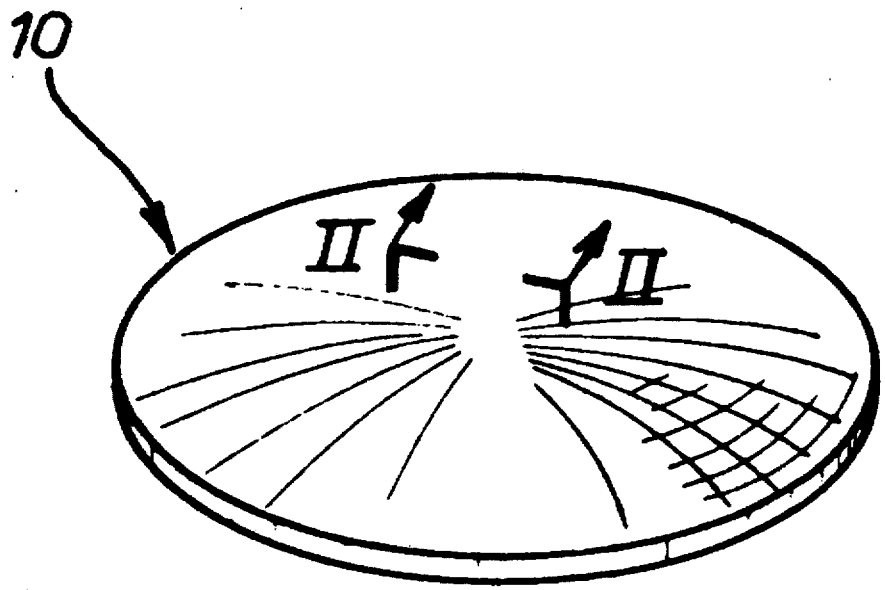

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–17 is confirmed.

* * * * *